G. S. WITHAM, Jr.
PAPER TESTER.
APPLICATION FILED MAY 14, 1920.

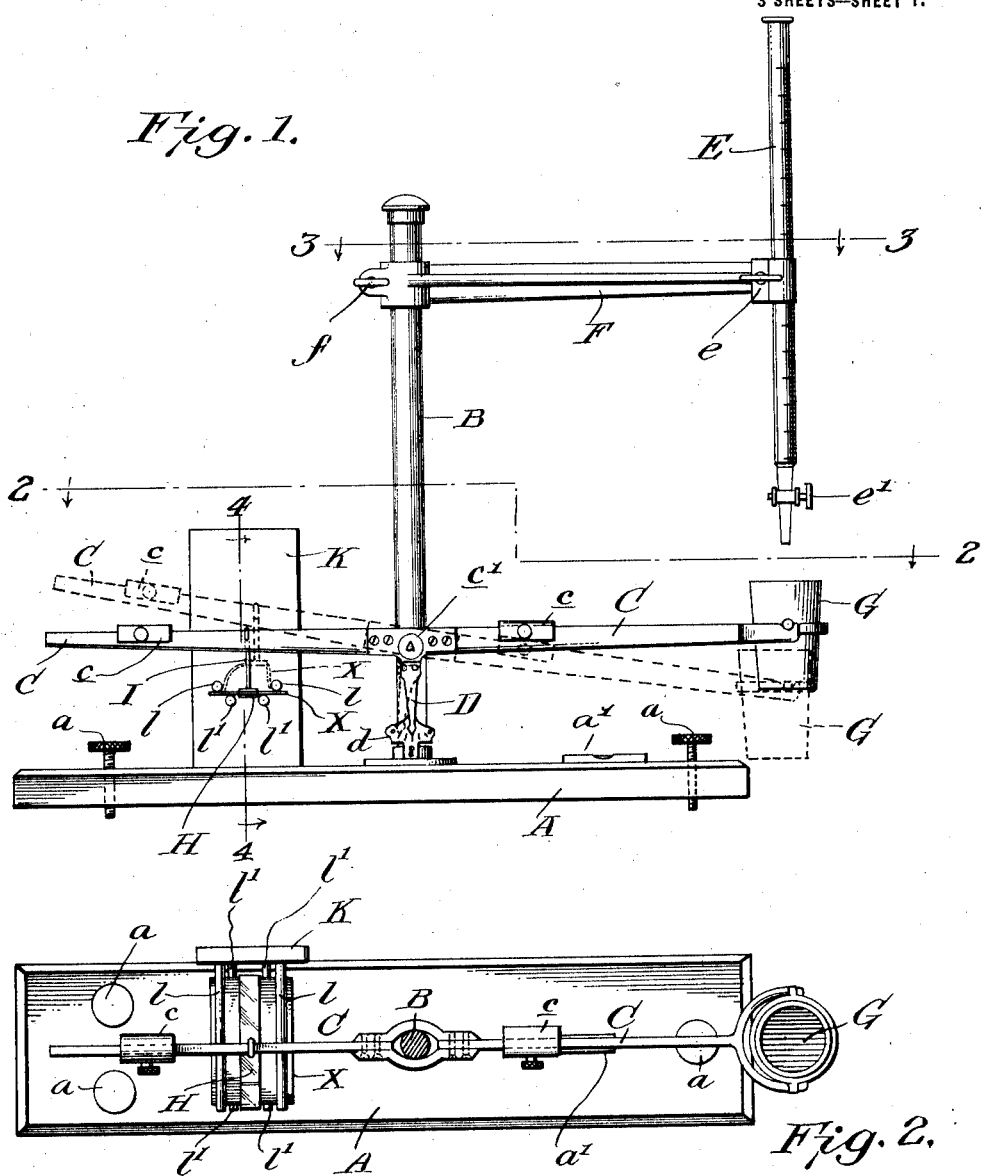
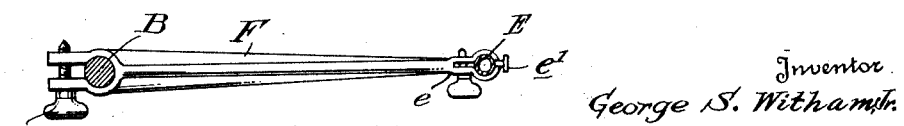

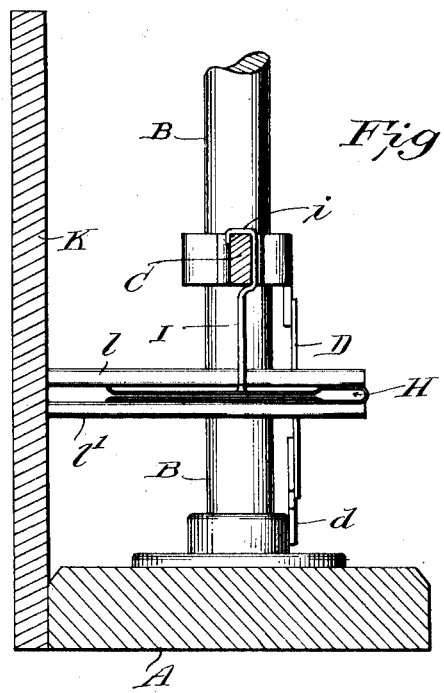
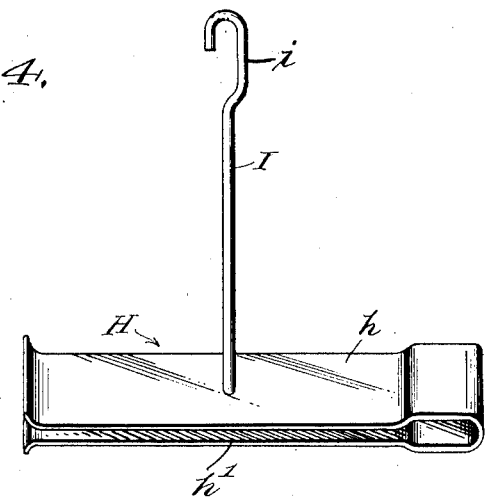
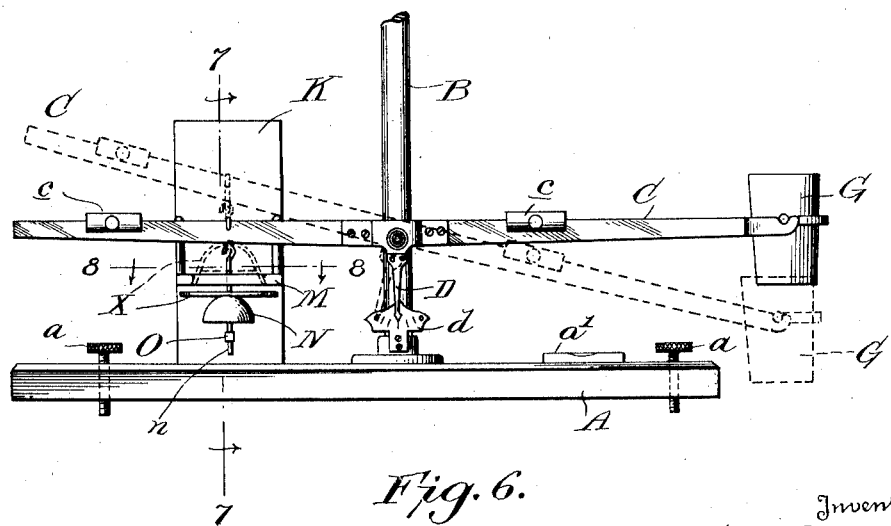

1,385,164.

Patented July 19, 1921.
3 SHEETS—SHEET 3.

Inventor
George S. Witham, Jr.
By his Attorneys

UNITED STATES PATENT OFFICE.

GEORGE S. WITHAM, JR., OF HUDSON FALLS, NEW YORK.

PAPER-TESTER.

1,385,164.      Specification of Letters Patent.    Patented July 19, 1921.

Application filed May 14, 1920. Serial No. 381,289.

*To all whom it may concern:*

Be it known that I, GEORGE S. WITHAM, Jr., a citizen of the United States, residing at Hudson Falls, in the county of Washington and State of New York, have invented certain new and useful Improvements in Paper-Testers, of which the following is a specification.

The object of this invention is to provide efficient means for testing the flexibility of paper.

A test of the flexibility of paper is one of great importance, especially where it is necessary to determine the service quality of heavy papers used in the manufacture of paper bags and sacks. The paper used in the manufacture of large paper bags and sacks and like containers should be strong and yet should be flexible in order that it may be properly folded and the folds secured.

Heretofore, so far as I am aware, no instrument or apparatus has been used for testing the flexibility or pliability of paper. Such tests have heretofore been performed by hand, the sense of touch or feeling being relied upon and this, of course, varies with different individuals and gives rise to great confusion and many disputes as to the quality of the paper with respect to its flexibility and general serviceability.

An instrument for testing the flexibility and strength of paper should indicate the force required to bend the paper both lengthwise and crosswise of the grain.

According to my invention, I provide an instrument with devices for bending the paper both lengthwise and crosswise of the grain and with means for indicating the force required to perform the bending operation.

The apparatus or instrument which I preferably employ comprises a device for holding a sample of paper to be tested, a pivotally mounted beam provided at one end with a device for engaging the paper and bending it in its support, and at its opposite end with means for applying weight to the beam. More specifically, the apparatus comprises a holder for the paper to be bent, a pivotally mounted beam provided with adjustable weights and equipped on one end with a bending device which forces the paper through its support, and at the opposite end with a receiver for a liquid supply by a calibrated burette tube provided with a valve for regulating the amount of liquid supplied to the receiver, the amount of liquid passing from the tube being indicated by the calibrations which also show the force required to perform the bending operation.

In the accompanying drawings:—

Figure 1 is a side view of one form of the apparatus.

Fig. 2 shows a section on the line 2—2 of Fig. 1.

Fig. 3 shows a section on the line 3—3 of Fig. 1.

Fig. 4 is a section on the line 4—4 of Fig. 1.

Fig. 5 is a perspective view of one form of bending device which may be employed.

Fig. 6 is a plan view of a modified form of the apparatus.

Figure 7:
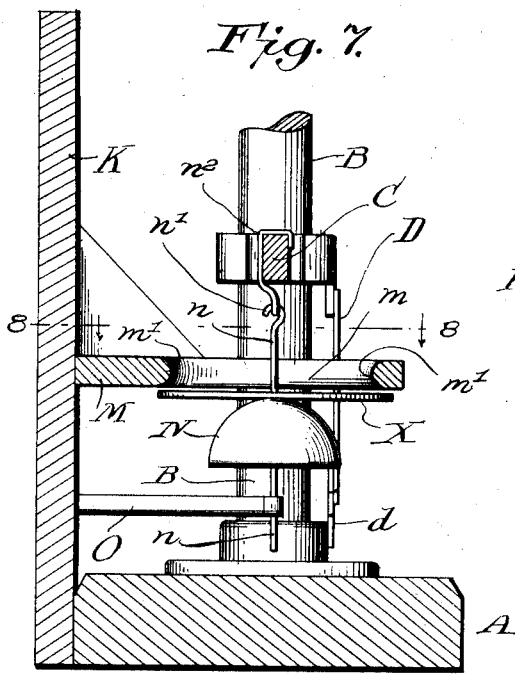
Fig. 7 shows a section on the line 7—7 of Fig. 6.

The base A of the instrument may be provided with screws $a$ by means of which it may be supported at the proper level. A spirit level $a'$ is carried by the base for an obvious purpose. To the base A is secured an upright post B to which is pivotally connected a beam C similar to a scale beam. This beam is provided with adjustable weights $c$ which may be moved back and forth over the beam and set at any desired place thereon. The beam carries a pointer D coöperating with a calibrated plate $d$ marked to indicate the amount of movement given to the beam and hence the distance traversed by the bending device.

A burette tube E is adjustably supported at $e$ in a bracket F adjustably connected at $f$ with the post B. The tube is calibrated, as shown, to indicate the amount of liquid passing from it, and thus the weight or force required to perform the bending operation. The tube is equipped with a valve $e'$ by means of which the flow of the liquid may be regulated. Liquid passing from the tube drops into a receiver G carried on one end of the beam C. At its opposite end the beam carries a bending device H which in this instance comprises a clamp (Fig. 5) consisting of two members $h$, $h'$ adapted to receive between them a small sample of paper to be tested. The bending device is suspended from the beam by a rod I having a hook $i$ on its upper end, which engages the beam in such manner that the bending device may be suspended freely therefrom. A sample X of the paper to be tested is held between pegs projecting laterally from an upright support K. As shown, there are four pegs, two upper ones $l$, $l$ and two lower ones $l'$, $l'$. The lower pegs are arranged closer together than the upper ones, and there is a space between the upper and lower pegs in which a sample of paper is held. The length of the sample is somewhat greater than the distance between the two upper pegs. The rod I is passed centrally through the sample and the paper is moved between the pegs, and the device is connected with the beam in the manner shown. When this is done the beam is balanced or made to assume a horizontal position as indicated in Fig. 1. This may be done by means of the weights $c$. After this the valve $e'$ may be opened and liquid allowed to pass from the burette tube to the receiver G. When sufficient liquid has been received to move the receiving end of the beam downwardly as indicated by dotted lines, the valve $e'$ should be closed. When the beam thus moves, the sample of paper is moved flatwise upwardly between the pegs $l$ and is bent in the manner indicated by dotted lines in Fig. 1 without being ruptured. By consulting the calibrated burette tube, the exact amount of liquid which has passed from it may be observed and the calibrations are such as to indicate a certain weight of liquid, and thus by a predetermined system indicate the force required to perform the bending operation. In this way the flexible qualities of the paper may be determined with the greatest accuracy.

Figure 8:
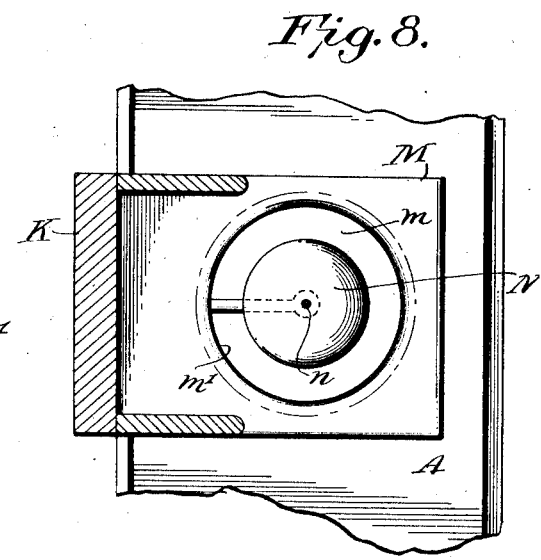
Fig. 8 shows a section on the line 8—8 of Fig. 6.

In Figs. 6, 7 and 8, I have shown a modified way of holding the paper and bending it. Most of the parts indicated in these figures are similar to those shown in Figs. 1 to 5 and they are similarly lettered, but in this instance the upright K is provided with a lateral projecting arm M having an opening $m$ through it, the edges of which are curved as indicated at $m'$. The opening $m$ is slightly smaller in diameter than the paper sample X which is placed beneath it and is adapted to pass through it. The bending device N is hemispherical with its convex side uppermost, and it is attached to a rod $n$ which extends through it. The lower end of the rod extends through an arm $o$ projecting from the upright K, and it is guided thereby. The upper end of the rod is formed with a hook $n'$ detachably engaging another hook $n^2$ removably supported on the beam C.

The sample of paper X is, in this instance, circular, and the rod is passed through a hole in the sample and its upper end is connected with the beam C. After the beam is balanced, liquid is passed through the tube E into the receiver in the manner before described. When the beam is moved by the weight of the liquid, the bending device on which the paper rests is moved upwardly against the arm M which holds the edge portion of the paper during the first part of the bending operation, and then the bending device causes the paper to slide through the hole $m$ and to assume the position shown in Fig. 6. The force required to perform the bending operation is indicated on the burette tube.

Figure 9:
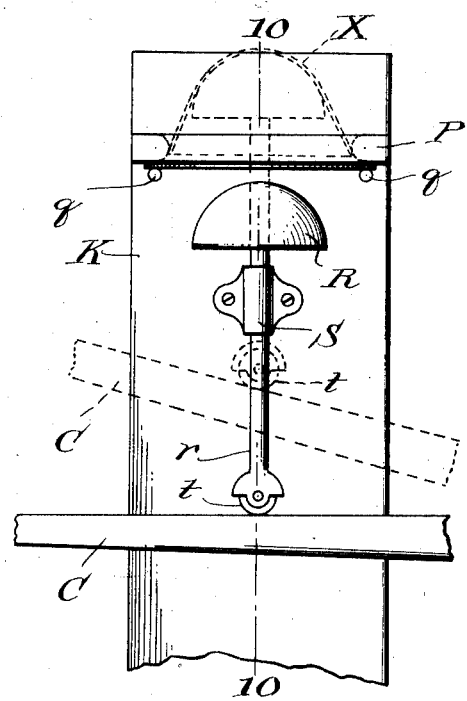
Fig. 9 is a detail view of a modified form of bending device.
Figure 10:
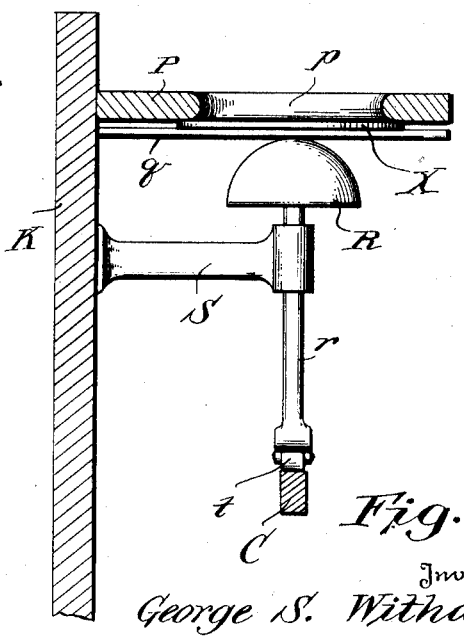
Fig. 10 is a sectional view of this device.

A further modification of the invention is shown in Figs. 9 and 10, where an arm P extending from the upright K is formed with an opening $p$ arranged above two pegs $q$ and the paper sample X is held between the arm P and the pegs. The bending device R is hemispherical and is carried by a rod $r$ extending through and guided by a bracket S projecting from the upright. At its lower end the rod carries a roller $t$ resting on the top of the beam C. When the adjacent end of the beam rises, the bending device is moved upwardly and pushes the paper through the opening in the bracket P.

In some cases it may be possible to perform the testing operation without taking any great amount of liquid from the burette tube. If the force required to perform the bending operation is known approximately the weights $c'$ may be so adjusted that the beam is weighted to nearly a sufficient extent to perform the bending operation. Then by allowing a relatively small amount of liquid to pass from the burette tube to the receiver, the operation may be completed.

I have shown several efficient ways of carrying out my invention, but have not attempted to illustrate or describe other modifications which might be made and which would be within the scope of my invention. The several devices shown and described illustrate the ways now best known to me for performing the desired operations.

It will be observed that when the paper passes through a device such as illustrated in Figs. 6 to 9, inclusive, the paper is bent both lengthwise and crosswise of the grain, which is a desirable feature of the invention.

It will be further observed that the instrument does not rupture the paper but merely bends it, the central part of the paper being first bent and the marginal parts being moved horizontally in the support and then vertically therethrough. In this way the tensile strength of the paper is not confused with its flexibility or pliable qualities.

I claim as my invention:—

1. An instrument for testing the flexibility of paper comprising a support in which a sample of paper to be tested is loosely mounted, a bending device for bending the paper both lengthwise and crosswise of the grain and for moving the paper flatwise through the support, a liquid receptacle connected with the bending device and a calibrated tube for delivering liquid to the receptacle.

2. An instrument for testing the flexibility of paper, comprising a support in which a sample of paper to be tested is loosely mounted, a bending device for moving the paper flatwise through its support, a pivotally mounted beam with which the device is connected, and means for adding weight to one end of the beam, having devices for indicating the force required to perform the bending operation.

3. An instrument for testing the flexibility of paper, comprising a support in which a sample of paper to be tested is loosely mounted, a bending device for moving the paper flatwise through its support, a pivotally mounted beam with one end of which the bending device is connected, an adjustable weight on the beam, a liquid receiver carried by the opposite end of the beam, and a calibrated tube for delivering liquid to the receiver.

4. A device for testing the flexibility of paper, comprising a part having an opening through it of smaller area than the sample of paper to be tested, a bending device for moving the sample of paper through said opening, a pivotally mounted beam with which the bending device is connected, an adjustable weight carried by the beam, a receiver for liquid carried by the beam, and a calibrated tube for supplying liquid to the receiver.

5. An instrument for testing the flexibility of paper, comprising a support on which a sample of paper to be tested is loosely mounted, a bending device engaging the under side of the paper for moving it flatwise through its support, a pivotally mounted beam with which the bending device is connected, means for adding weight to one end of the beam, having means for indicating the force required to perform the bending operation.

6. An instrument for testing the flexibility of paper, comprising a support in which a sample of paper to be tested is loosely mounted, a bending device for moving the paper flatwise through its support, a pivotally mounted beam with which the bending device is connected, a liquid receiver on one end of the beam, and a calibrated tube arranged over the receiver and which is marked to indicate the force required to perform the bending operation.

In testimony whereof, I have hereunto subscribed my name.

GEORGE S. WITHAM, Jr.